United States Patent
Kato et al.

(10) Patent No.: US 6,726,464 B1
(45) Date of Patent: Apr. 27, 2004

(54) MIXING DEVICE FOR MANUFACTURING MOLDING

(75) Inventors: Masami Kato, Tokyo (JP); Konomi Hasumi, Tokyo (JP); Masatoshi Ishikawa, Shiraoka-machi (JP)

(73) Assignee: Misawa Homes Co. (JP)

( * ) Notice: Subject to any disclaimer, the term of this patent is extended or adjusted under 35 U.S.C. 154(b) by 0 days.

(21) Appl. No.: 09/555,168

(22) PCT Filed: May 22, 1998

(86) PCT No.: PCT/JP98/02263

§ 371 (c)(1),
(2), (4) Date: Jul. 18, 2000

(87) PCT Pub. No.: WO99/28110

PCT Pub. Date: Jun. 10, 1999

(30) Foreign Application Priority Data

Dec. 4, 1997 (JP) .............................................. 9/333779

(51) Int. Cl.[7] .............................................. B29C 47/04
(52) U.S. Cl. .......................... 425/203; 425/208; 366/75; 366/76.6; 366/76.93; 366/89
(58) Field of Search ................. 425/203, 208; 366/75, 76.6, 76.9, 76.93, 81, 88, 89

(56) References Cited

U.S. PATENT DOCUMENTS

| 2,604,659 | A | * | 7/1952 | Eppler ........................ 366/76.9 |
| 2,947,030 | A | * | 8/1960 | Varn ........................ 366/76.6 |
| 3,327,348 | A | * | 6/1967 | Roehlig et al. ............. 366/76.9 |
| 3,388,196 | A |   | 6/1968 | Farrell ........................ 264/75 |
| 3,599,292 | A | * | 8/1971 | Ronzoni et al. ............. 425/203 |
| 3,737,150 | A | * | 6/1973 | Otake ........................ 366/75 |
| 3,799,510 | A | * | 3/1974 | Schott, Jr. ..................... 366/75 |
| 3,966,857 | A |   | 6/1976 | Charlton et al. .............. 264/75 |
| 3,985,348 | A | * | 10/1976 | Skidmore ..................... 366/75 |
| 4,089,510 | A | * | 5/1978 | Picard et al. ............... 425/208 |
| 4,314,765 | A | * | 2/1982 | Hotz ........................... 366/75 |
| 4,976,904 | A | * | 12/1990 | Bilhorn ...................... 264/104 |
| 5,123,828 | A | * | 6/1992 | Surface ..................... 425/203 |
| 5,217,800 | A |   | 6/1993 | Pentecost .................... 428/283 |
| 5,620,642 | A |   | 4/1997 | Kamite et al. ............... 264/115 |

FOREIGN PATENT DOCUMENTS

| JP |   57011033 A | * | 1/1982 |
| JP |   62-198435  |   | 2/1987 |
| JP |   02175106 A | * | 7/1990 |
| JP |   04363203 A | * | 12/1992 |

* cited by examiner

Primary Examiner—Robert Davis
Assistant Examiner—Joseph S. Del Sole
(74) Attorney, Agent, or Firm—Wolf, Greenfield & Sacks, P.C.

(57) ABSTRACT

An apparatus for manufacturing moldings by which clear colors and patterns can be brought out without a remarkable lowering of strength. Immediately before delivery to a metal mold, outer resin material positioned on the main cylinder inner wall side is put in the molten state, and inner resin material positioned on the main screw side is controlled to be from the softening temperature to the melting temperature both inclusive to be extrusion-molded as they are. The inner wall of the main cylinder is expanded where the outer resin material is received to help the outer resin material be thrown in smoothly.

6 Claims, 9 Drawing Sheets

MIXING DEVICE FOR MANUFACTURING MOLDING

FIELD OF THE INVENTION

This invention relates to a resin molding device and a resin molding method, and particularly to the molding technology for presenting a clear pattern in plastics containing a pigment and also preventing a remarkable lowering of strength.

BACKGROUND OF THE INVENTION

1. Prior Art

The technology of manufacturing a molding presenting colors and patterns by mixing a pigment in resin has been known for long. Typical of the above is the technology of mixing powder (wood flour) of natural wood in resin to manufacture a molding, the so-called wood plastic, and various technology has been proposed heretofore. Among them, the technology of "cellulosic granular powder, a wood-like molding and a wood-like product" disclosed in PCT JP94/00351 (International Laid-Open No.: WO94/20280) will now be described in brief.

The pulverized powder obtained by grinding cellulose material as raw material is ground to obtain granular powder increased in bulk specific gravity, a surface grain which has a diameter smaller than that of the granular powder and is harder than the powder is fixed to the outer peripheral surface of the granular powder to obtain a fixed grain, resin and a pigment are mixed with the fixed grain and molten, and after that, or simultaneously with melting, the mixture is formed into a desired shape by extrusion molding or injection molding. According to this technology, it is possible to provide a method of manufacturing a wood-like product and a wood-like product which has a pattern very close to the grain of natural wood and also has feeling such as the touch or the like close to the natural wood.

The technique about the device for extrusion molding is disclosed in prior art such as U.S. Pat. No. 3,966,857, U.S. Pat. No. 3,388,196 and JP-A-62198435.

2. Disadvantage of the Prior Art

It is, however, true that not only in the above technology, giving of coloring to a resin molding is hard to be incompatible with keeping the strength of the resin molding. That is, it is preferable to incompletely mix resin in order to give coloring to the resin molding, but if done so, the strength of the molding is lowered. On the contrary, if mixing is performed completely, the strength of the molding can be increased, but the coloring fades.

Objects of the Invention

A problem to be solved by the invention is to provide the technology by which giving of coloring to a resin molding is made compatible with preventing a remarkable lowering of strength of the resin molding.

It is an object of the invention to provide a method of manufacturing a molding by which clear colors and patterns can be presented without a remarkable lowering of strength.

It is another object of the invention to provide a mixing device for extrusion molding by which clear colors and patterns can be presented without a remarkable lowering of strength.

Further in detail, listed are the respective objects of the invention.

One object of the invention is to provide a manufacturing method by which clear colors and patterns can be presented without a remarkable lowering of strength and to provide a method of manufacturing a molding having the woody feel.

Another object of the invention is to provide a manufacturing method y which a molding having a clear pattern can be manufactured.

Another object of the invention is to provide a mixing device for extrusion molding by which energy required for manufacture can be held down, and by which a molding having a clear pattern can be manufactured.

Another object of the invention is to provide a mixing device for extrusion molding by which the existing equipment can be utilized to the maximum.

The present invention is intended for accomplishing the described objects.

In one embodiment, the invention is a molding manufacturing method using a mixing device 10 for extrusion molding comprising a main cylinder 11 positioned on this side of a metal mold for shaping a molding and a main screw 12 rotated in the main cylinder 11 for mixing resin material 20 and delivering the same to the metal mold, wherein immediately before delivery to the metal mold, an outer resin material 21 positioned on the inner wall side of the main cylinder 11 is put in the molten state, and an inner resin material 22 positioned on the main screw 12 side is controlled to be from the softening temperature to the melting temperature both inclusive. Moreover, cellulose material is mixed with the outer resin material 21. Furthermore, cellulose material mixed with the outer resin material 21 is fixed grains formed by fixing a surface grain which has a diameter smaller than that of the pulverized powder obtained by pulverizing the cellulose material and is harder than the powder to the outer peripheral surface of the pulverized powder.

The "main"of the "main cylinder 11" means any one of cylinders in multilayer molding, for example, and the only one cylinder in monolayer molding. The "main " of the "main screw 12" means a screw incorporated in the main cylinder, and in the case of using plural screws in the main cylinder, it means all of the screws.

As concrete means for "immediately before delivery to the metal mold, putting an outer resin material 21 positioned on the inner wall side or the main cylinder 11 in the molten state, and controlling an inner resin material 22 positioned on the main screw 12 side to be from the softening temperature to the melting temperature both inclusive", cited are means for controlling the temperature of a heater for heating the main cylinder and the main screw, means for making the particle size of resin material positioned on the main cylinder inner wall side smaller than that of resin material positioned on the main screw side, and the like.

Here, "resin material" means material used at the time of making a resin molding such as polyvinyl chloride which is thermoplastic resin or the like. Though only the resin as base material will be resin material, if wood flour (cellulose material) is contained in resin, it becomes resin material used in the so-called wood plastic molding.

As for the resin material used in wood plastic molding, it is frequent to use the material obtained by mixing wood flour with resin and pelletizing the same in addition Lo the powdered material obtained by mixing wood flour with powder resin. Further, frequently in order to produce a pattern of the grain of wood, "resin material" is added to wood flour and resin to obtain a mixture of a pigment. In that case, sometimes one kind of a pigment will be sufficient, and sometimes plural kinds of pigments are used. In the case of using plural kinds of pigments, "resin material" can be made by preparing plural kinds of pellets with different pigments and mixing the same.

The cellulose material used in manufacturing fixed grains is ordinarily natural wood, or sawdust, but rice straw and bagasse may be used.

As a method of forming fixed grains by "fixing surface grains which have a diameter smaller than that of the granular powder and are harder than the powder to the surface of pulverized powder", cited are grinding using a ball mill, long-time high-speed mixing using a mixer, and so on. By these methods, fuzz of fibers of the cellulose material is decreased. Processing for removing fuzz of fibers of the cellulose material may be performed separately from fixing of surface grains.

The "surface grains"are metal, metal compounds such as titanium oxide, ferrite, aluminum, nickel, silver, calcium carbonate and the like, and nonmetal such as ceramic or the like.

The percentage of fixed grains mixed with resin to the whole is usually set not more than 30 wt %. The reason is that sometimes the fluidity at the time of melting the material to be molded becomes worse to interfere with molding.

The material formed by mixing fixed grains with resin which is resin material may be pulverulent or be previously molded to be pelletized. In order to bring out a pattern of the grain of wood, sometimes one kind of a pigment will be sufficient, but frequently plural kinds of pigments are used. In order to use plural kinds of pigments, plural kinds of pellets having different pigments in "material formed by mixing resin and a pigment with fixed grains" are prepared and mixed to form "resin material".

As wood flour in resin material is fixed grains, it is possible to manufacture a wood-like product which has patterns very close to the grain of natural wood on the surface and also has a feeling such as the touch or the like very close to that of natural wood.

Immediately before delivery to the metal mold, outer resin material 21 of the resin material 20 is to be put in the molten state, so that while being clamped between the inner wall of the main cylinder 11 and an inner resin material 22, it is rubbed by the inner wall of the main cylinder 11 to be mixed. Soon at the time of delivery from the forward end of the main screw 12 to the metal mold, the material is clamped between the inner wall of the main cylinder 11 and the forward end part of the main screw 12 to be delivered.

On the other hand, the inner resin material 22 is controlled to be from the softening temperature to the melting temperature both inclusive, so that it is delivered in the state of being little mixed to the metal mold.

Since the outer resin material 21 of the resin material 20 is mixed, the strength will not be lowered remarkably unlike the case in which every resin for forming a molding is mixed merely incompletely.

Moreover, as cellulose material is contained in the outer resin material 21, a molding has the wood feeling brought out on the surface thereof.

Furthermore, since pulverization and fixing of surface grains are performed for cellulose material mixed with resin material, fuzz of the cellulose material can be decreased so as to manufacture a molding heightened in a wood feeling.

In another embodiment, the invention defines a method of manufacturing a molding as described above, wherein the outer resin material 21 is made different from the inner resin material 22 in color.

As means for varying the color of resin material, means for varying the kind of a pigment to be mixed with the resin material is general.

If plural kinds of pigments different in color are mixed with the outer resin material 21 turned to be molten, sometimes it is possible to bring out a delicate tone of color. Mixing to such a degree not to lower the strength of a molding causes the case where as plural kinds of pigments are made monochromatic, sometimes mixing is not completely performed.

According to this embodiment, the outer resin material 21 is not completely mixed with the inner resin material 22 not molten. Accordingly, it is possible to manufacture a molding which will not turn to a color intermediate between the outer resin material 21 and the inner resin material 22.

In another embodiment, the invention defines a method of manufacturing a molding as described above, wherein cellulose material is mixed with the inner resin material 22.

As the cellulose material is contained not only in the outer resin material 21 but in the inner resin material 22, it is possible to provide a molding having a wood feeling all over the molding.

In another embodiment, the invention defines a method of manufacturing a molding as described above, wherein the cellulose material mixed with the inner resin material 22 is formed by fixing surface grains which have a diameter smaller than that of pulverized powder obtained by pulverizing the cellulose material and are harder than that to the outer peripheral surface of the pulverized powder.

In another embodiment, the invention defines a method of manufacturing a molding as described above, wherein the cellulose material mixed with the inner resin material 22 is formed by fixing surf ace grains which have a diameter smaller than that of pulverized powder obtained by pulverizing the cellulose material and are harder than that to the outer peripheral surface of the pulverized powder.

As pulverization and fixing of surface grains are performed for the cellulose material mixed with the inner resin material 22, fuzz of the cellulose material can be decreased so as to provide a molding heightened in a wood feeling of the whole molding.

In another embodiment, a mixing device 10 for extrusion molding comprising a main cylinder 11 positioned on this side of a metal mold for forming a molding, and a main screw 12 rotated in the main cylinder 11 for mixing resin material 20 and delivering the same to the metal mold, immediately before delivery to the metal mold, the outer resin material 21 positioned on the inner wall side of the main cylinder 11 is put in the molten state, and the inner resin material 22 positioned on the main screw 12 side is formed in such a manner as to be controlled from the softening temperature to the melting temperature both inclusive. Moreover, the device includes a sub-throw-in machine for throwing the outer resin material 21 in the mixing device for extrusion molding, and the sub-throw-in machine is provided separately from the main throw-in machine (e.g. main hopper 13) for throwing in the inner resin material 22 and comprises an outer resin material holding part (e.g. sub-hopper 14) for holding the outer resin material 21 and a sub-throw-in hole for delivering the outer resin material 21 to the main cylinder 11, the sub-throw-in hole being communicated with a receiving hole positioned between the metal mold in the main cylinder 11 and the main throw-in machine 13. Furthermore, the receiving hole of the main cylinder 11 (e.g. formed by removing a receiving hole forming member 11A) is formed in such a manner as to expand the receiving hole 11A on the rotating direction side of the main screw 12 in the cylinder inner wall.

The "main throw-in machine" is generally called "hopper".

The sub-cylinder of the "sub-throw-in machine" may be a hopper, but as defined in the claim 13, it may be provided with a screw.

The receiving hole 11A is expanded by providing a notch part 11F by chamfering using an inversed spot facing tool.

Since the outer resin material 21 of the resin material 20 is put in the molten state immediately before delivery to the medal mold, mixing is performed by rubbing of the inner wall of the main cylinder 11. Soon at the time of delivering the material from the forward end of the main screw 12 to the metal mold, the material is clamped between the inner wall of the main cylinder 11 and the forward end part of the main screw 12 to be delivered.

On the other hand, as the inner resin material 22 is controlled to be from the softening temperature to the melting temperature both inclusive, it is delivered in the state of being little mixed to the metal mold.

As the outer resin material 21 of the resin material 20 is mixed, the strength will not be remarkably lowered unlike the case of quite incomplete mixing.

Moreover, as the sub-throw-in machine is provided separately from the main throw-in machine (e.g. main hopper 13) for throwing in the inner resin material 22, it is easy to put the outer resin material 21 in the molten state and control the inner resin material 22 to be from the softening temperature to the melting temperature both inclusive.

Furthermore, as the rotating direction side of the main screw 12 in the receiving hole 11A is expanded, the outer resin material 21 can be smoothly thrown in.

In another embodiment, the invention defines a mixing device for manufacturing a molding as claimed in claim 20, 14 and wherein the receiving hole 11A is a vent hole 11B previously provided in the mixing device 10 for extrusion molding.

Here, the "vent hole 11B" is an air vent hole provided for removing gas contained in resin material or generated from resin material. As air is let escape from the vent hole 11B according to the kind of resin material and the property of a molding in some case, if there are provided plural vent holes 11B, one can be used as a feed port for the outer resin material 21 and the other can be used as an air vent hole.

Since the ordinary mixing device for extrusion molding is provided with a vent hole, it can be applied, so that the existing equipment can be utilized.

In another embodiment, the invention defines a mixing device for manufacturing a molding as described above, wherein the sub-throw-in machine 15 is provided with a sub-screw 17 rotated in the sub-cylinder 16 for mixing and delivering the outer resin material 21 held in the sub-cylinder 16.

On this side of a metal mold in the main cylinder 11, the outer resin material 21 to be put in the molten state is molten and mixed and then fed into the main cylinder 11 by the sub-cylinder 16 and the sub-screw 17.

In another embodiment, the invention defines the mixing device for manufacturing a molding as described above, wherein there are provided plural (e.g. five) receiving holes of the main cylinder 11 in the direction of extrusion.

As there are provided plural receiving holes 11 of the main cylinder 11 in the direction of extrusion, it is possible to select and use the receiving holes appropriate for a molding according to various conditions such as desired colors and patterns, the kind of resin and the like. Further, the receiving hole can be used as a vent hole.

In another embodiment, the invention defines the mixing device for manufacturing a molding as described above, wherein the area in the main screw 12 that corresponds to the receiving hole is formed in such a manner that the diameter of the main screw 12 is smaller than that of the other area.

The area in the main screw 12 that corresponds to the receiving hole is formed in such a manner that the diameter of the main screw 12 is smaller than that of the other area, whereby the outer resin material 21 can be smoothly thrown in from the receiving hole.

PREFERRED EMBODIMENT FOR IMPLEMENTING THE INVENTION

Figure 1:
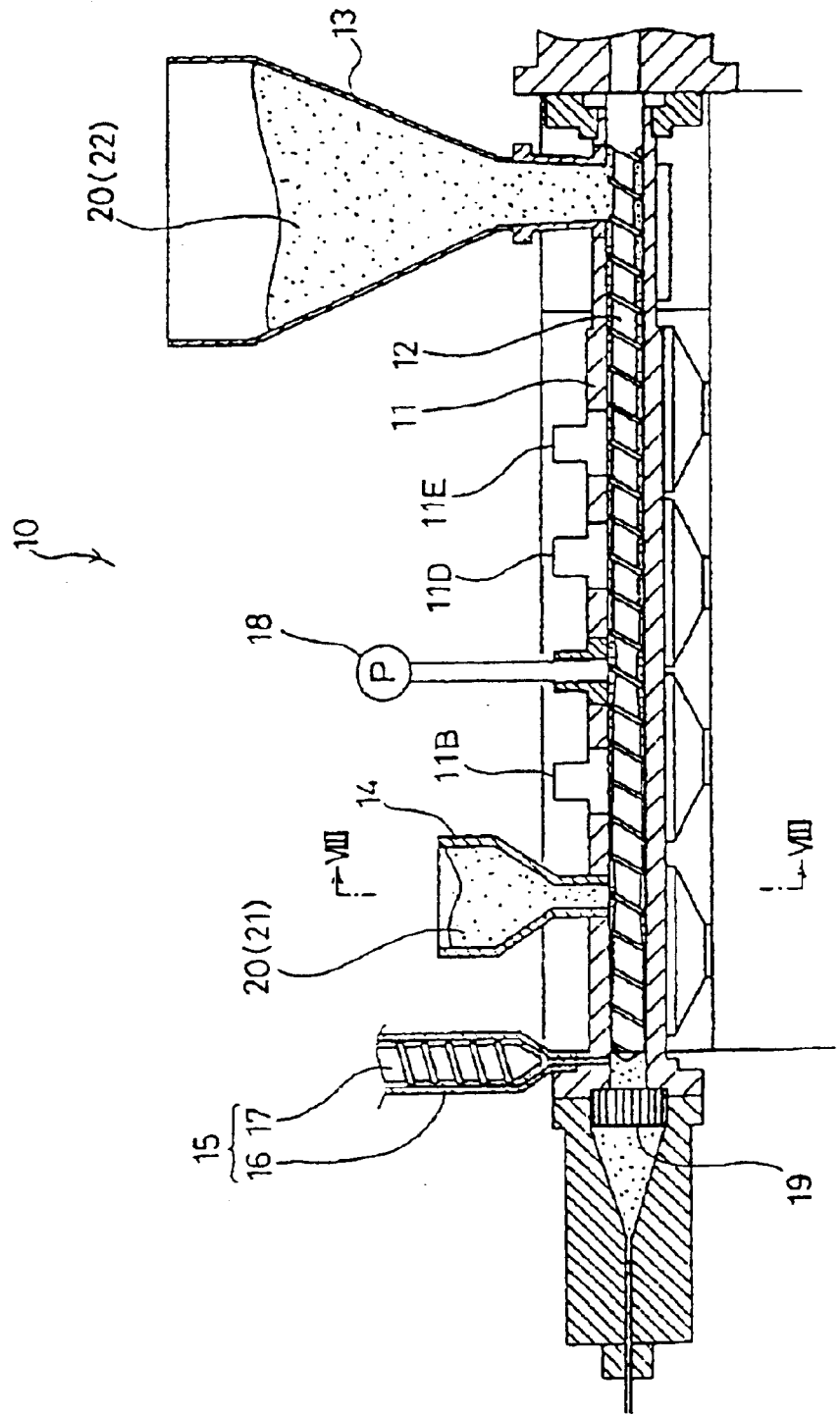
FIG. 1 is a sectional view showing the outline of a first embodiment according to the present invention.
Figure 2:
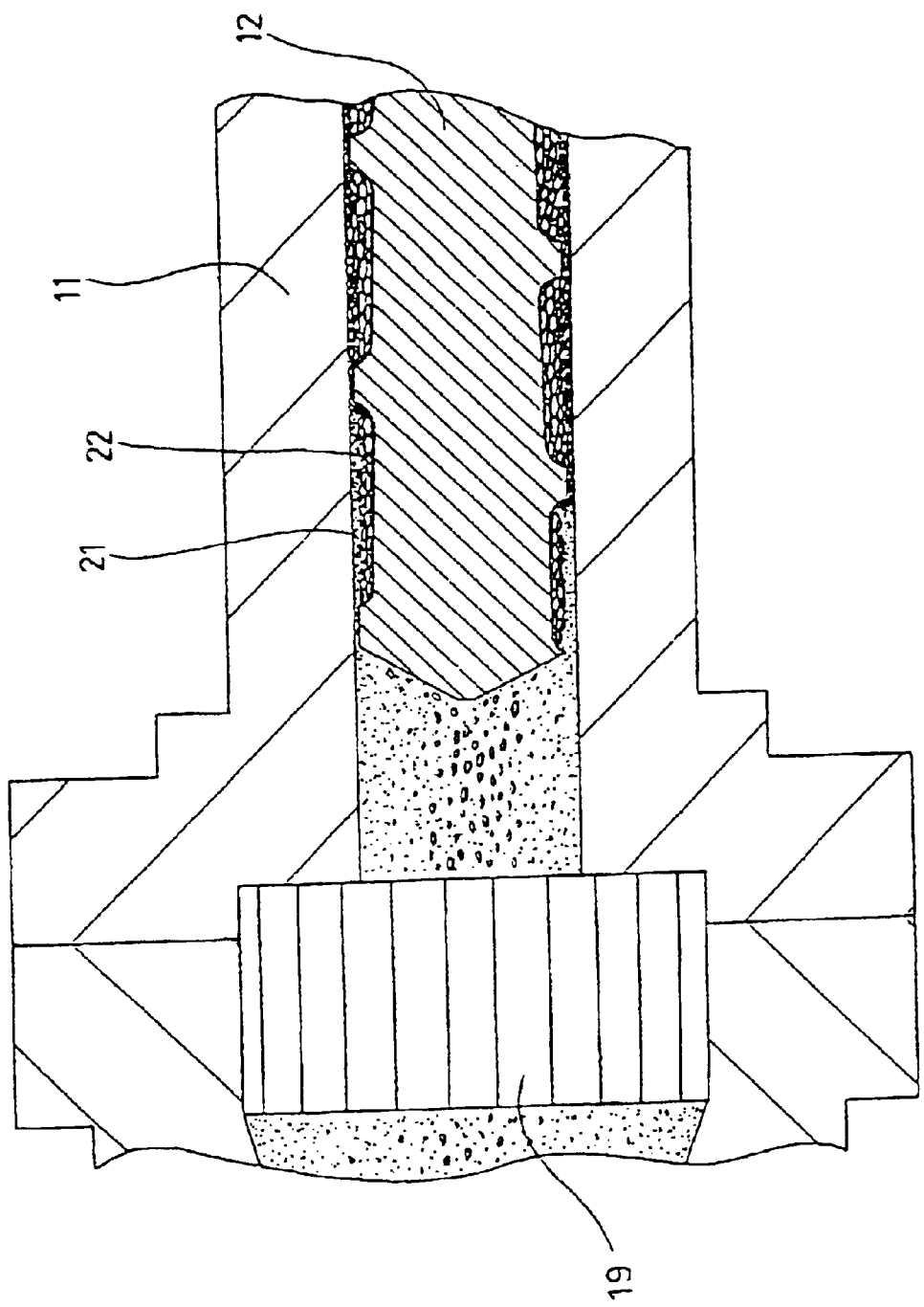
FIG. 2 is an enlarged view showing the principal part in the first embodiment.

The present invention will now be described further in detail with reference to the embodiments and drawings. The drawings used in the description are FIGS. 1 to 9.

Constitution of the First Embodiment

First the constitution of this embodiment will be described.

This embodiment is an extrusion molding device comprising a mixing device 10 for extrusion molding, a hopper for throwing resin material 20 in the mixing device 10 for extrusion molding, and a metal mold for forming a molding from mixed and extruded material. Moldings formed of the resin material 20 by this extrusion molding device have grain patterns on the outer surface, and the resin material for forming the grain pattern part and the resin material for forming the inside of the outer surface part are made different in coloring and respectively taken to be the outer resin material 21 and the inner resin material 22. To be concrete, the kinds of pigments to be mixed are varied.

The outer resin material 21 uses plural kinds of pigments. To be concrete, pellets are manufactured by pigments, and plural kinds of pellets are used by designated rate. Thus, a tone of color, colors and patterns desired for moldings are easy to be determined by selection of pellets and the mixing rate of pellets.

The mixing device 10 for extrusion molding includes a main cylinder 11 positioned on this side of a metal mold (not shown), and a main screw 12 rotated in the main cylinder 11 for mixing resin material and delivering the same to the metal mold.

The main cylinder 11 is provided with throw-in hole forming members 11A, B, C, D, E (11C is not shown) formed continuously in the axial direction, which can be removed to be communicated with the cylinder inner space of the cylinder. When the throw-in hole forming members 11A, B, C, D, E are removed, "receiving holes" are formed. In FIG. 1, the throw-in hole forming member 11C positioned in the middle of the five continuously located throw-in hole forming members is removed to communicate a pump 18 with the cylinder inner space to perform deaeration. That is, the receiving hole from which the throw-in hole forming member 11C is removed is used as the so-called "vent hole".

As a hopper for throwing in the resin material 20, in addition to a funnel-like main hopper 13 erected on the start end part of the mixing device 10 for extrusion molding, the throw-in hole forming member 11A is removed to be taken as a receiving hole, and a sub-hopper 14 as an outer resin material holding part is installed therein. From the main hopper 13, the inner resin material 22 is thrown in, and from the sub-hopper 14, the outer resin material 21 is thrown in.

Further, a sub-mixing machine 15 for mixing transparent resin for coating the surface of a molding and delivering the same to the main cylinder 11 is installed in a part of the main cylinder that corresponds to the vicinity of the forward end of the main screw 12. The sub-mixing machine 15 comprises a sub-cylinder 16 and a sub-screw 17 rotated in the interior of the sub-cylinder 16.

A breaker plate 19 is provided between the main cylinder 11 and the metal mold.

Figure 6:
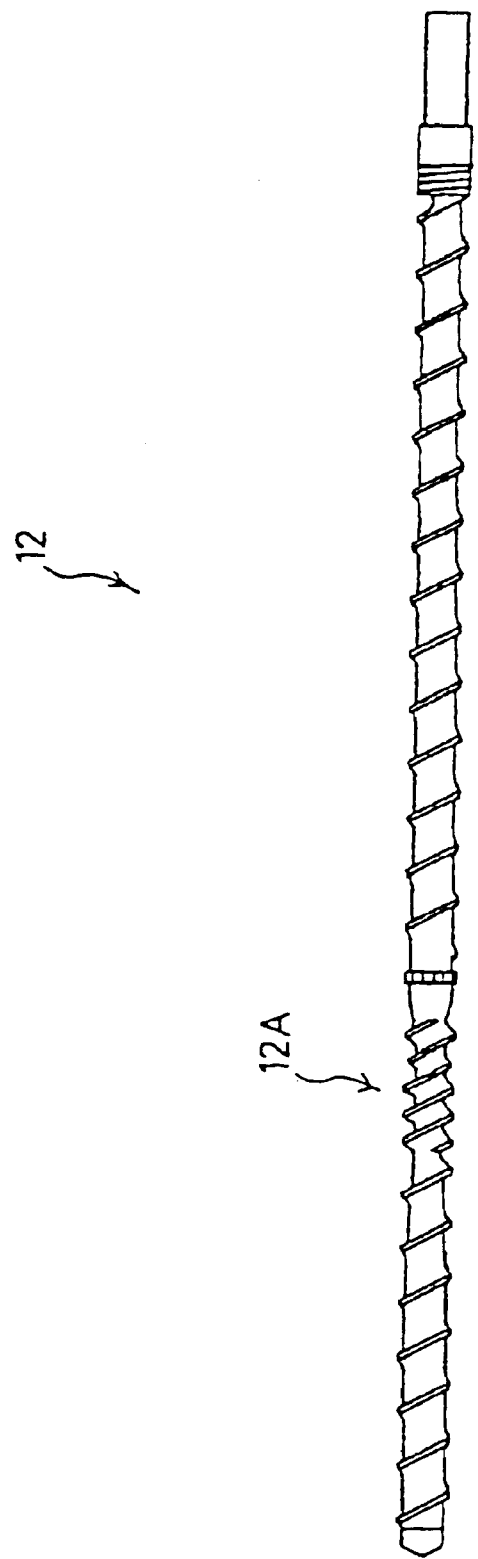
FIG. 6 is an outside drawing of a screw used in the embodiment.
Figure 7:
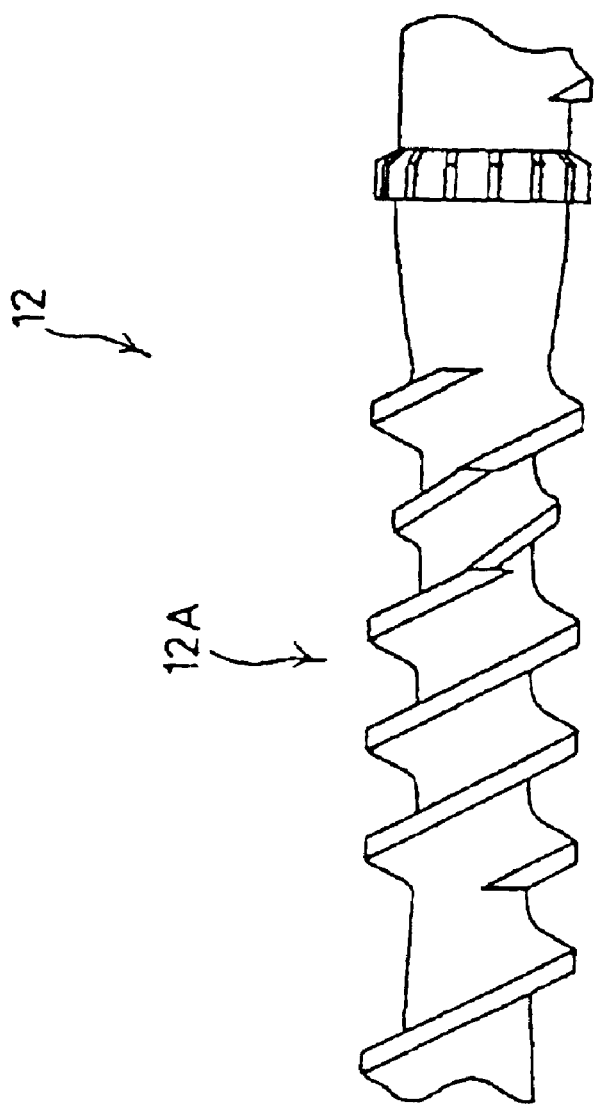
FIG. 7 is an enlarged view showing the principal part in FIG. 6.
Figure 8:
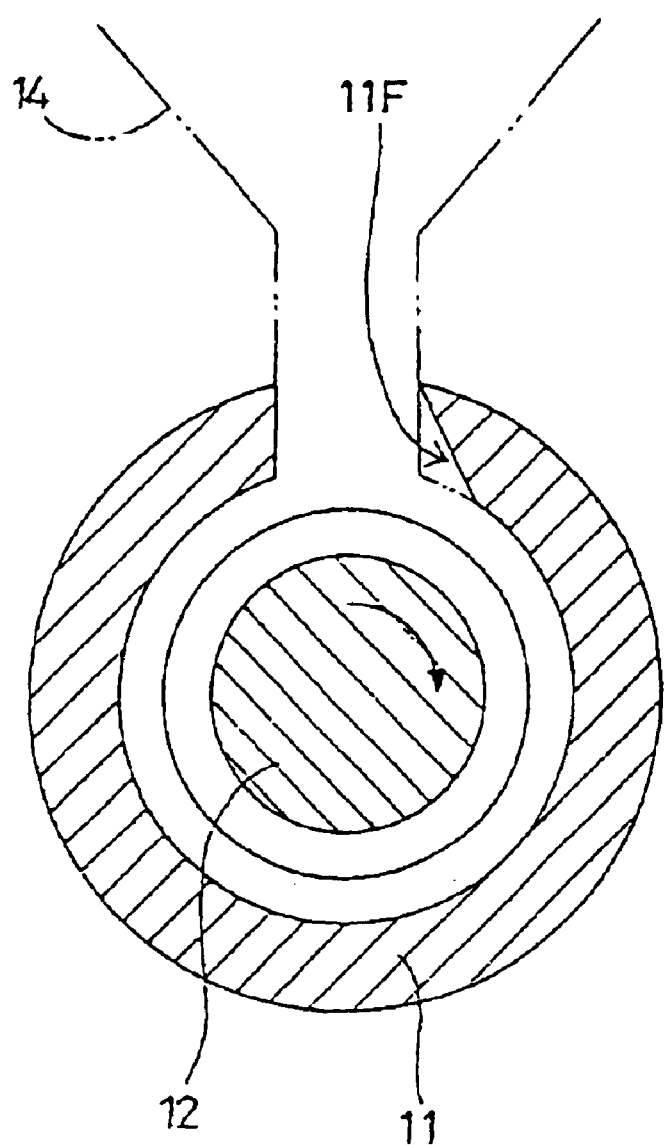
FIG. 8 is a sectional view taken along line VIII—VIII showing a longitudinal section of a sub-hopper in FIG. 1.

As shown in FIG. 8, in the cylinder inner wall corresponding to the receiving hole in the main cylinder 11, a part on the rotating direction side of the main screw is formed in such a manner as to be expanded. To be concrete, the receiving hole is expanded by providing a notch part 11F by chamfering using an inversed spot facing tool. The main screw 12 is, as shown in FIGS. 6 and 7, formed as a small-diameter part 12A in which the diameter of the main screw is contracted more than that of the other part. As described above, by expansion of the corresponding position in the main cylinder 11 to the receiving hole and by contraction of the corresponding position in the main screw 12 to the receiving hole, the outer resin material 21 thrown in from the sub-hopper 14 can be forced to smoothly enter the main cylinder 11.

Resin Material of Moldings in the First Embodiment

As described above, moldings formed by the resin material 20 by using the extrusion molding device are composed of the outer resin material 21 for presenting the grain patterns on the outer surface, the inner resin material 22 for forming the inside of the outer surface part, and transparent resin material for coating the outer surface.

The outer resin material 21 is the material for producing patterns by plural different colors. In this embodiment, plural types (e.g. a brown group, a red group) of resin pellets containing a pigment are prepared. As resin, vinyl chloride is adopted. The reason why the pellet is taken is that it is convenient for throw-in work, storage and transport, but it may be also all right to throw in the pellet of resin only and the pigment separately. About 10% wood flour formed by pulverizing cellulose material is contained in the above resin pellet. The wood flour is "the processed wood flour obtained by fixing surface grains (calcium carbonate) which have a diameter smaller than that of pulverized powder obtained by pulverizing cellulose material and are harder than the powder to the outer peripheral surface of the pulverized powder to form fixed grains and mixing resin and a pigment with the fixed grains". The moldings formed by resin containing the thus processed wood flour have less fuzz on the surfaces of the moldings than the simple wood flour, and the wood feeling thereof is also high-grade.

The inner resin material 22 is a pellet where a pigment of a color lighter than that of the outer resin material 21 is mixed with resin. If the resin pellet of the same material quality as that of the outer resin material 21 is used, "fit" between the outer part and the inner part becomes better, so generally the same material quality is adopted. On the other hand, there are a few parts coming up to the surface of the molding, the material for improving the appearance quality may be saved more than the outer resin material 21. For example, some of resin used in forming a pellet is regenerated resin, ordinary wood flour is contained instead of the processed wood flour, or the wood flour itself is not contained.

It is necessary that the outer resin material 21 has a higher temperature than the inner resin material 22 in the vicinity of the forward end of the main screw 12, so that in some case, the size of a pellet thrown in from the sub-hopper 14 is made smaller than that of a pellet of the inner resin material 22. In that case, the temperature of the outer resin material 21 is easy to rise, and sometimes it becomes easier "to put the outer resin material 21 in the molten state, and control the inner resin material 22 to be from the softening temperature to the melting temperature both inclusive".

Experimental Example

In the above-described mixing device 10 for manufacturing a molding, immediately before delivery to a metal mold, the outer resin material 21 positioned on the inner wall side of the main cylinder 11 is put in the molten state, and the inner resin material 22 positioned on the main screw 12 side is controlled to be from the softening temperature to the melting temperature both inclusive. The transparent resin of the outer surface is omitted in this experimental example, and a sub-mixing machine 15 was not used.

The following is the further detailed description.

First of all, the experiment conditions are listed: under the conditions that the temperature is 12° C. and the humidity is 34%, hard vinyl chloride is adopted as a main raw material of the resin material 20, the rotating speed of a main screw is 15 rpm, and a frame material with a cross section of 525 mm 2 is formed by extrusion molding.

The temperature of each part is 140° C. just under the main hopper 13, and 150° C. in the central part of the main screw 12, the temperature on the inner wall side of the main cylinder 11 in the forward end part of the main screw 12, that is, the temperature of the outer resin material 21 is 175° C., and the temperature of the inner resin material 22 positioned on the main screw 12 side in the forward end part of the inner resin material 22 is 165° C.

Figure 9:
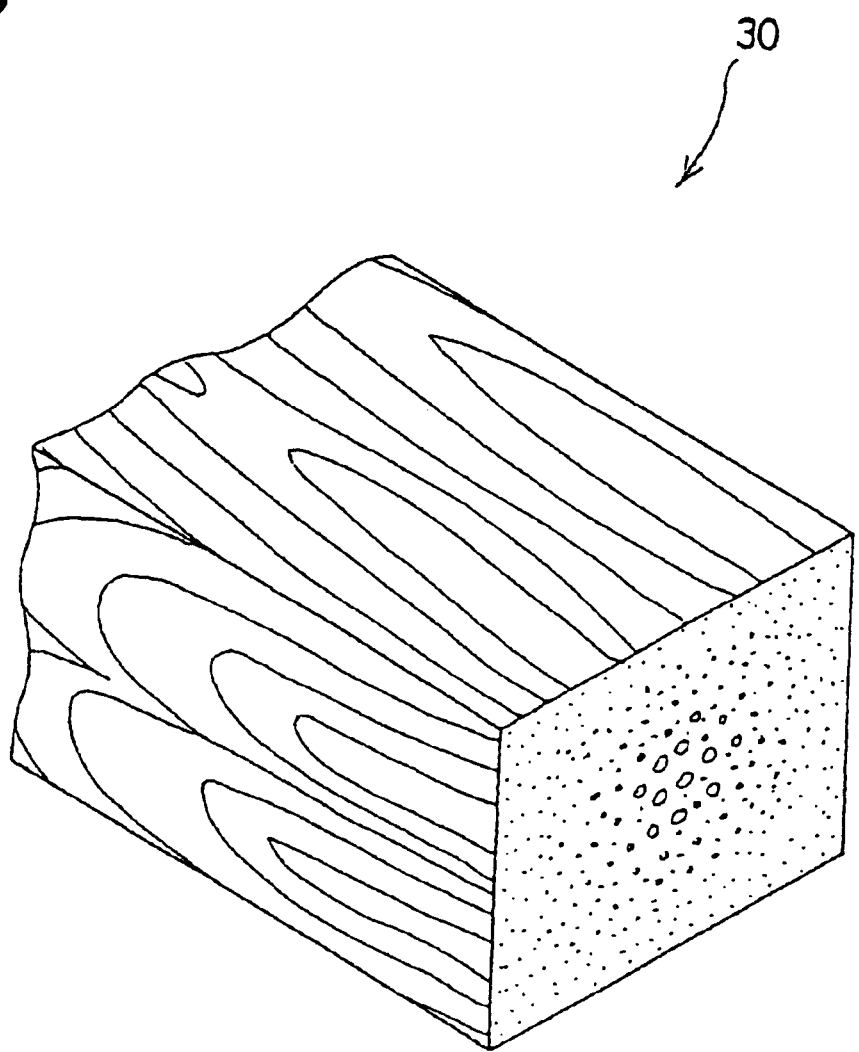
FIG. 9 is a perspective view showing the section of a molding manufactured by a manufacturing method and a manufacturing device according to the present invention.

When extrusion molding is performed under the described conditions, as the outer resin material 21 immediately before delivery to a metal mold is put in the molten state, mixing is performed by rubbing of the inner wall of the main cylinder 11. Soon at the time of delivering the material from the forward end of the main screw 12 to the metal mold, the material is clamped between the inner wall of the main cylinder 11 and the forward end part of the main screw 12 to be delivered. On the other hand, the inner resin material 22 is controlled to be from the softening temperature to the melting temperature both inclusive, so that it is delivered in the state of being little mixed to the metal mold. As a result, as shown in FIG. 9, sometimes traces of a pellet which is the inner material 22 are left behind in the inside part of the section in a molding 30. On the other hand, patterns of the grain of wood appear on the outer surface, and the pellet is completely molten near the outer surface so that traces of the pellet are hardly seen.

As the outer resin material 21 of the resin material 20 is mixed, the strength will not be lowered remarkably unlike the case of quite incompletely mixing. On the other hand, energy required for manufacture can be held down more than in the case where all of the resin material 20 is put in the molten state. Further, since the outer resin material 21 and the inner resin material 22 are different in state not to be mixed completely, clear and fine patterns of the grain of wood were brought about on the outer surface. Further, as the processed wood flour having little fuzz is contained in the outer resin material 21, a molding has the wood feeling on the surface.

Second Embodiment

Figure 3:
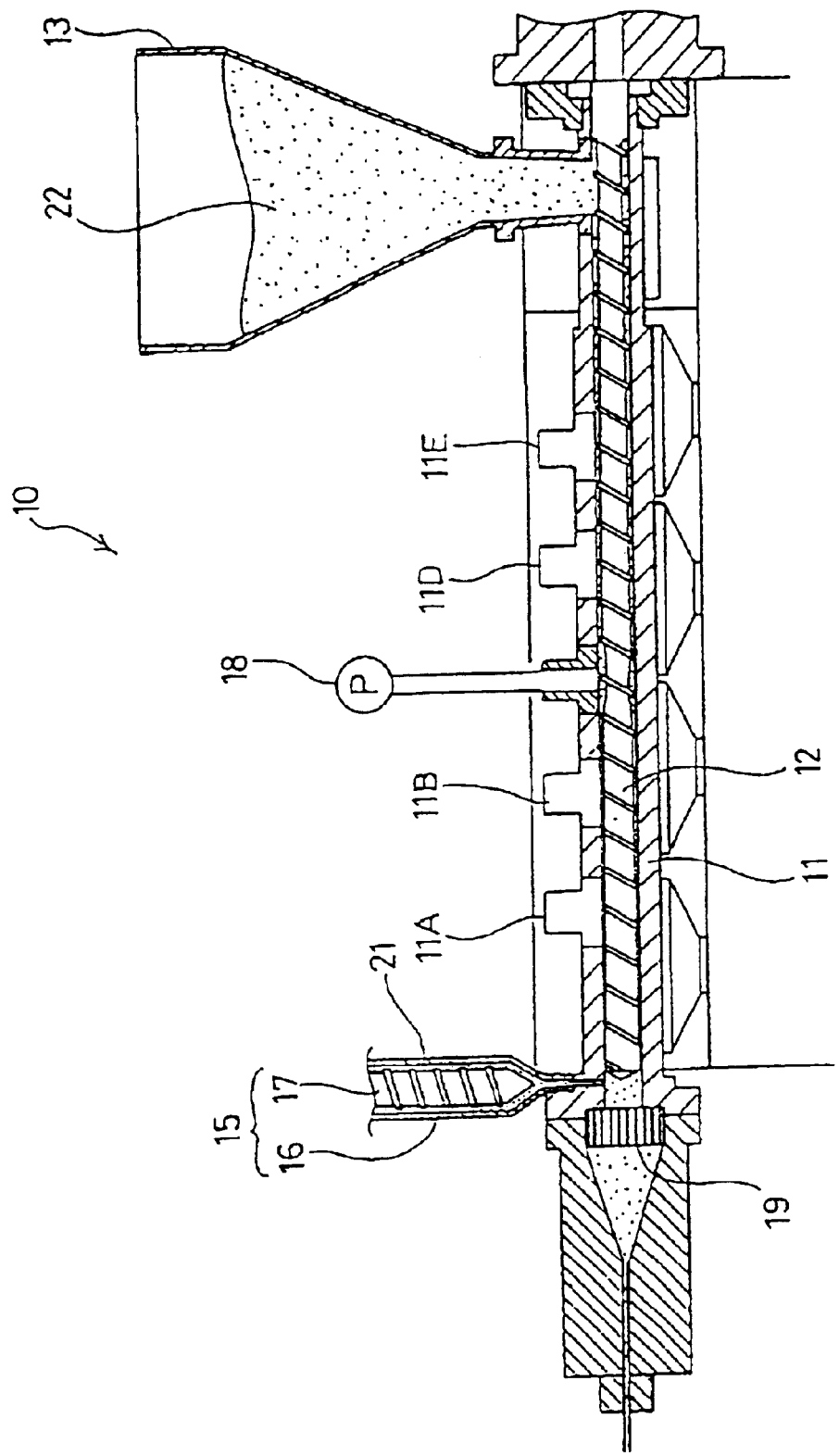
FIG. 3 is a sectional view showing the outline of a second embodiment.

A second embodiment will be described in brief with reference to FIG. 3.

The difference between the second embodiment and the first embodiment is that the sub-hopper 14 provided in the first embodiment is not provided in the second embodiment to throw in the outer resin material 21 from the sub-mixing machine 15. Accordingly, transparent resin of the outer surface is omitted.

As the sub-mixing machine 15 is adapted to throw in the outer resin material 21 on the metal mold side of the forward end of the main screw 12, the temperature is controlled so that in throwing-in, the material has been already put in the molten state. Thus, the outer resin material 21 may be put in the molten state in the sub-mixing machine 15, so that sometimes it is easy to control the temperature of the outer resin material 21 and the inner resin material 22.

Also in the described arrangement, it is possible to manufacture moldings substantially similarly to the first embodiment.

Third Embodiment

Figure 4:
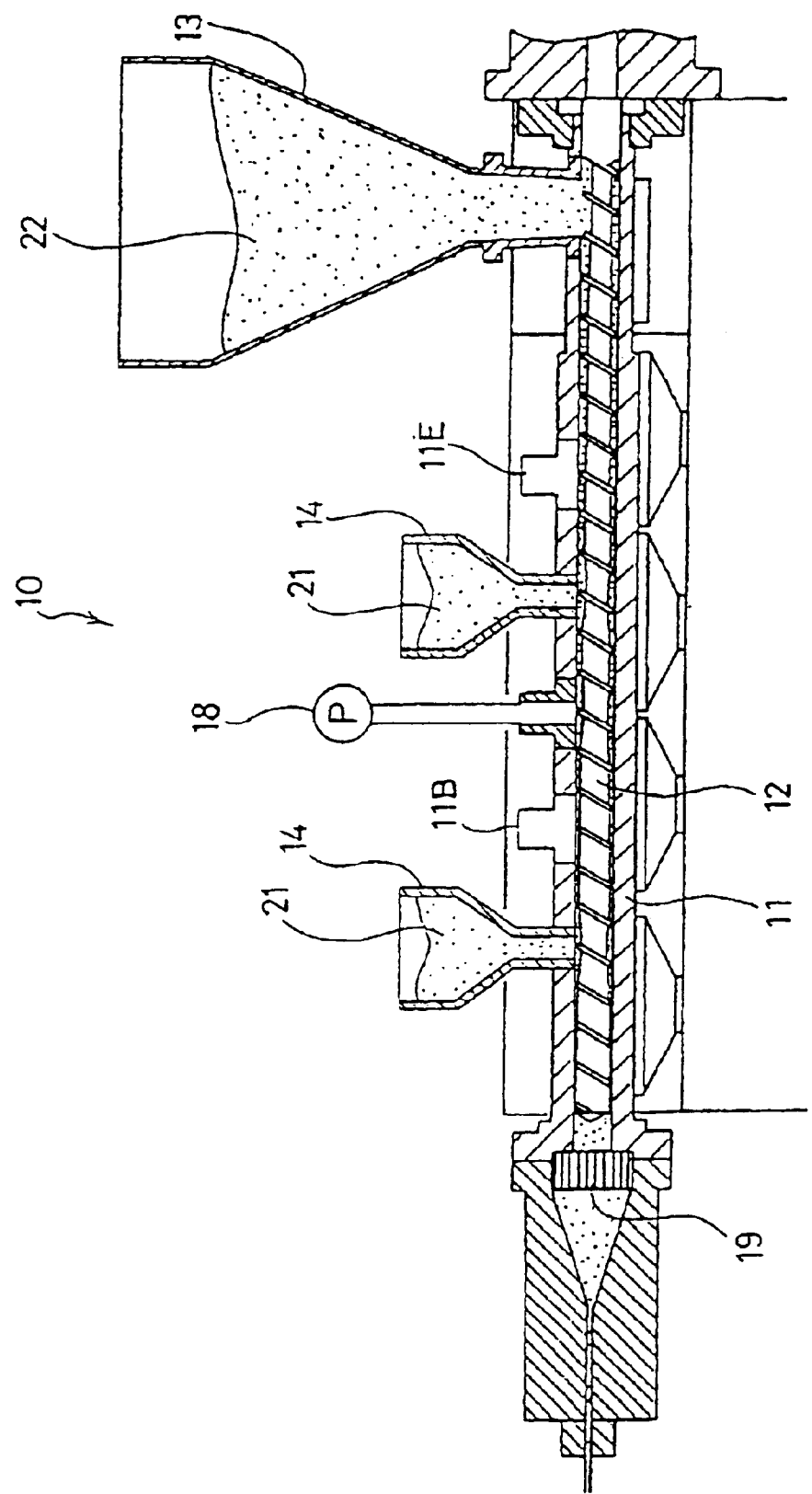
FIG. 4 is a sectional view showing the outline of a third embodiment.

A third embodiment will be described in brief with reference to FIG. 4.

The difference between the third embodiment and the first embodiment is that though one sub-hopper 14 is provided in the first embodiment, there are two sub-hoppers in the third embodiment, thereby throwing in the outer resin material 21 from two sub-hoppers 14, 14. The corresponding positions of the sub-hoppers 14, 14 in the main screw 12 are, as shown in FIG. 7, a small diameter part, and the main cylinder 11 is provided with a notch part 11F shown in FIG. 8. The transparent resin of the outer surface is omitted.

The sub-hoppers 14, 14 are fixed with the throw-in hole forming members 11A, 11D removed from the main cylinder 11. The outer resin material 21 is put in the respective sub-hoppers 14, 14 as pellets different in coloring. Thus, the molten state of the outer resin material 21 can be made different from that in the first embodiment to contribute to production of a delicate tone of color.

Also in the described arrangement, it is possible to manufacture moldings which are different in the appearance pattern from that of the first or second embodiment but have the substantially same quality as that thereof.

Fourth Embodiment

Figure 5:
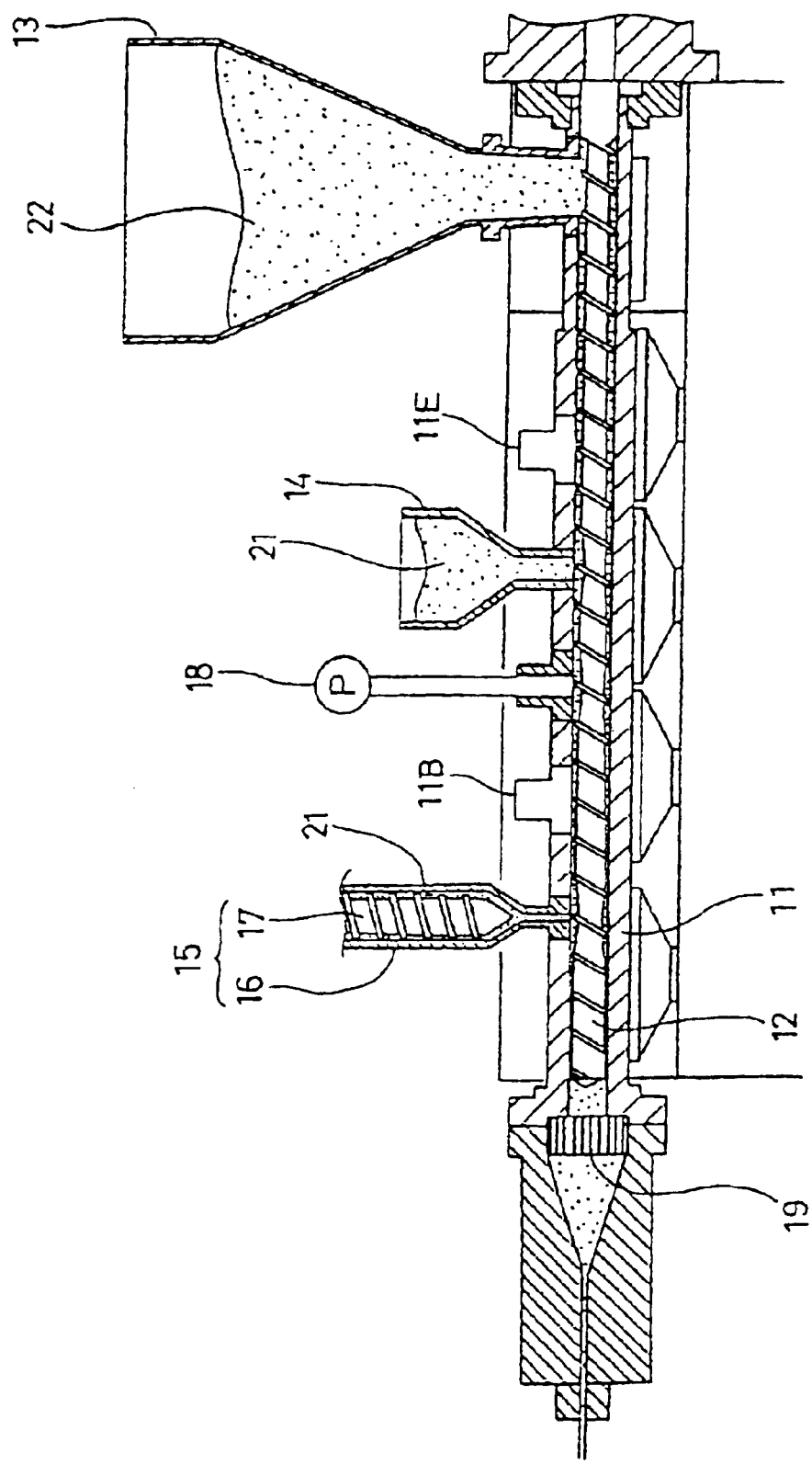
FIG. 5 is a sectional view showing the outline of a fourth embodiment.

A fourth embodiment will be described in brief with reference to FIG. 5.

The difference between the fourth embodiment and the first embodiment is that the sub-mixing machine 15 and the sub-hopper 14 provided in the first embodiment are respectively disposed in separate places, and the outer resin material 21 is thrown in from the sub-mixing machine 15 and the sub-hopper 14 in the fourth embodiment. The corresponding positions to the sub-mixing machine 15 and the sub-hopper 14 in the main screw 12 are small-diameter parts, and the main cylinder 11 is, as shown in FIG. 8, provided with a notch part 11F. The transparent resin of the outer surface is omitted.

The sub-mixing machine 15 is fixed with the throw-in hole forming member 11A removed from the main cylinder 11, and the sub-hopper 14 is fixed with the throw-in hole forming member 11D removed therefrom. The outer resin material 21 is put in the sub-mixing machine 15 and the sub-hopper 14 as pellets different in coloring. Thus, the molten state of the outer resin material 21 can be made different from that of the first, second or third embodiment so as to contribute to a delicate coloring.

Also in the described arrangement, it is possible to manufacture moldings which are different in the appearance pattern from that of the first or second or third embodiment but have the substantially same quality as that thereof.

Variation

As shown in the first to fourth embodiments, plural throw-in holes can be freely formed on the mixing device 10 for manufacturing a molding, whereby it is possible to manufacture moldings, the appearances of which have various tones of color.

Further, the position of the vent hole which has been described as the same place (11C) in the above embodiments can be suitably selected.

Advantages of the Invention

According to the present invention, it is possible to provide the technology by which giving of coloring to a resin molding is made compatible with preventing a remarkable lowering of strength of the resin molding.

According to one embodiment of the invention, it is possible to provide a manufacturing method by which colors and patterns can be produced without a remarkable lowering of strength. Moreover, it is possible to provide a method of manufacturing moldings having the wood feel.

According to another embodiment of the invention, it is possible to provide a manufacturing method by which moldings having clear patterns can be manufactured.

According to another embodiment of the invention, it is possible to provide a mixing device for extrusion molding by which energy required for manufacture can be held down, and by which moldings having clear patterns can be manufactured.

According to another embodiment of the invention, it is possible to provide a mixing device for extrusion molding by which the existing equipment can be utilized to the utmost.

Field of Industrial Use

This invention is utilized in the field of industry using the technology of molding in such a manner as to present clear surface patterns, for example, pattern of the grain of wood and not to lower the strength remarkably in plastics containing a pigment.

What is claimed is:

1. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole; and wherein said main screw has a small diameter part, a diameter of which is made smaller than that of other parts of said main screw, adjacent to the expansion of said receiving hole.

2. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole;

wherein said receiving hole is a vent hole previously provided in said mixing device for extrusion molding; and wherein said main screw has a small diameter part, a diameter of which is made smaller than that of other parts of said main screw, adjacent to the expansion of said receiving hole.

3. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole;

wherein said sub-throw-in machine includes a sub-screw rotated in a sub-cylinder for mixing outer resin material held in said sub-cylinder and delivering the same; and wherein said main screw has a small diameter part, a diameter of which is made smaller than that of other parts of said main screw, adjacent to the expansion of said receiving hole.

4. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole;

wherein there are plural receiving holes of said main cylinder in a direction of extrusion; and wherein said main screw has a small diameter part, a diameter of which is made smaller than that of other parts of said main screw, adjacent to the expansion of said receiving hole.

5. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole;

wherein said receiving hole is a vent hole previously provided in said mixing device for extrusion molding;

wherein there are plural receiving holes of said main cylinder in a direction of extrusion; and wherein said main screw has a small diameter part, a diameter of which is made smaller than that of other parts of said main screw, adjacent to the expansion of said receiving hole.

6. A mixing device for manufacturing mouldings comprising a main cylinder connected to a metal mold for forming moldings, a main screw rotated in said main cylinder for mixing resin material and delivering the same to said metal mold, a main throw-in machine connected to said main cylinder at a start end part thereof for throwing inner resin material, which forms an inner part of said molding, into said main cylinder, a sub-throw-in machine connected to said main cylinder at a part between said metal mold and said main throw in machine for throwing outer resin material, which forms an outer part of said molding, into said main cylinder, an outer resin material holding part for holding said outer resin material, a sub-throw-in hole for delivering said outer resin material to said main cylinder, and a receiving hole positioned, in said main cylinder, between said metal mold and said main-throw-in-machine;

characterized in that a rotating direction side of said main screw in a cylinder inner wall of said receiving hole of said main cylinder is formed in such a manner as to expand said receiving hole;

wherein said sub-throw-in machine includes a sub-screw rotated in a sub-cylinder for mixing outer resin material held in said sub-cylinder and delivering the same;

wherein there are plural receiving holes of said main cylinder in a direction of extrusion; and wherein said main screw has a small diameter part, a diameter of which is made smaller than that of other parts of said main screw, adjacent to the expansion of said receiving hole.

* * * * *